Aug. 31, 1965 A. J. DEYRUP 3,203,876
PROCESS FOR PREPARING CHROMIUM FILM PRODUCTS
Original Filed Aug. 9, 1961 2 Sheets-Sheet 1

INVENTOR
ALDEN J. DEYRUP
BY *James C. Carle*
ATTORNEY

INVENTOR
ALDEN J. DEYRUP

United States Patent Office 3,203,876
Patented Aug. 31, 1965

3,203,876
PROCESS FOR PREPARING CHROMIUM FILM PRODUCTS
Alden J. Deyrup, West Chester, Pa., assignor to E. I. du Pont de Nemours and Company, Wilmington, Del., a corporation of Delaware
Original application Aug. 9, 1961, Ser. No. 130,317. Divided and this application Aug. 11, 1964, Ser. No. 388,755
5 Claims. (Cl. 204—13)

This application is a divisional application of my copending application Serial No. 130,317, filed August 9, 1961, which is a continuation-in-part application of my application Serial No. 844,906, filed October 7, 1959 which is now abandoned.

This invention relates to processes for producing chromium films and products comprising such films.

In the metallizing of many objects, of metal, cloth, paper, wood, cement, masonry materials and others, a very desirable means is to adhere with an adhesive to them a thin, self-sustaining film containing thereon a very thin layer of metal, of the order of ½ to 100 microinches. A microinch is one millionth of an inch. A thin metal cover can economically confer a brilliant metallic appearance; repel heat by reflecting radiation; conserve heat by the low emissivity characteristics of bright metallic surfaces; protect outdoors the underlying materials such as polymers, cloth, etc. from the damaging effects of ultraviolet by reflection of the same, as well as minimizing the transmission of water vapor. Although metal foils can be used for the same purposes in the same way, the extremely thin metal layer adhered to a self-sustaining film possesses the advantages of greater flexibility without visible damage to the metal layer, and relative freedom from wrinkling resulting in better appearance. Also, it is more economical to produce and use because less metal is required.

Metallized polymer films with nickel, copper, and especially aluminum have been used for this purpose. However, their applications have been seriously restricted by the easy corrosion of these metals, which is exceptionally damaging at the desirable low thicknesses of ½ to 100 microinches. For example, vacuum deposited aluminum on polyester film is widely used in shredded form in textiles to impart glitter. Alkaline detergents cannot be used on such fabrics because they dissolve the aluminum. The above metals, when used thus to metallize objects, generally require a lacquer coating for protection. Even so, they are not suitable for outdoor use because of the damaging effect of light on the lacquer, and the corroding action of the outdoor atmosphere on the metal.

A composite film consisting of a thin self-sustaining film and, bonded thereto, a thin film of pure, highly reflective chromium would be very useful for this purpose, because chromium is extremely resistant to corrodants including all those commonly present in outdoor exposure. Attempts have been made to deposit chromium on polymer film by pyrolysis of chromium carbonyl. However, deposits made thus are known to be very hard and brittle and to be composed not of chromium metal but rather of chromium oxide mixed with chromium carbide. Attempts have been made also to metallize polymer film by vacuum vapor deposition, but such deposits have been low in reflectance, i.e., a reflectance of less than 60% of the reflectance of a polished 302 stainless steel, as measured by a Hunter Reflectometer, and the deposited metal is poorly adherent. It is known that vacuum vapor-deposited chromium on organic polymeric materials does not have a bright metallic surface and, therefore, it is not used as a bright metal film.

By the term "pure chromium" as used throughout the specification and claims is meant chromium of at least 95% purity as distinguished from chromium oxide or carbide, obtained by pyrolysis of chromium carbonyl.

It is, therefore, an object of this invention to produce transferable pure bright chromium films having a thickness of between ½ and 100 microinches and preferably between ½ and 20 microinches.

It is another object of this invention to produce exceedingly thin pure bright chromium films on an adhesive supporting film.

It is still another object of this invention to produce exceedingly thin transferable pure bright chromium films by electrodeposition on a metallic surface.

It is another object to provide a method of transferring exceedingly thin electroformed pure bright chromium films from a metal surface onto substrates of different kinds.

It is yet another object of this invention to provide both flexible and rigid base materials having bonded thereto by means of an adhesive an exceedingly thin layer of pure bright chromium.

Other objects of this invention will become apparent from the following description when read in connection with the accompanying illustrations in which.

Figure 2:
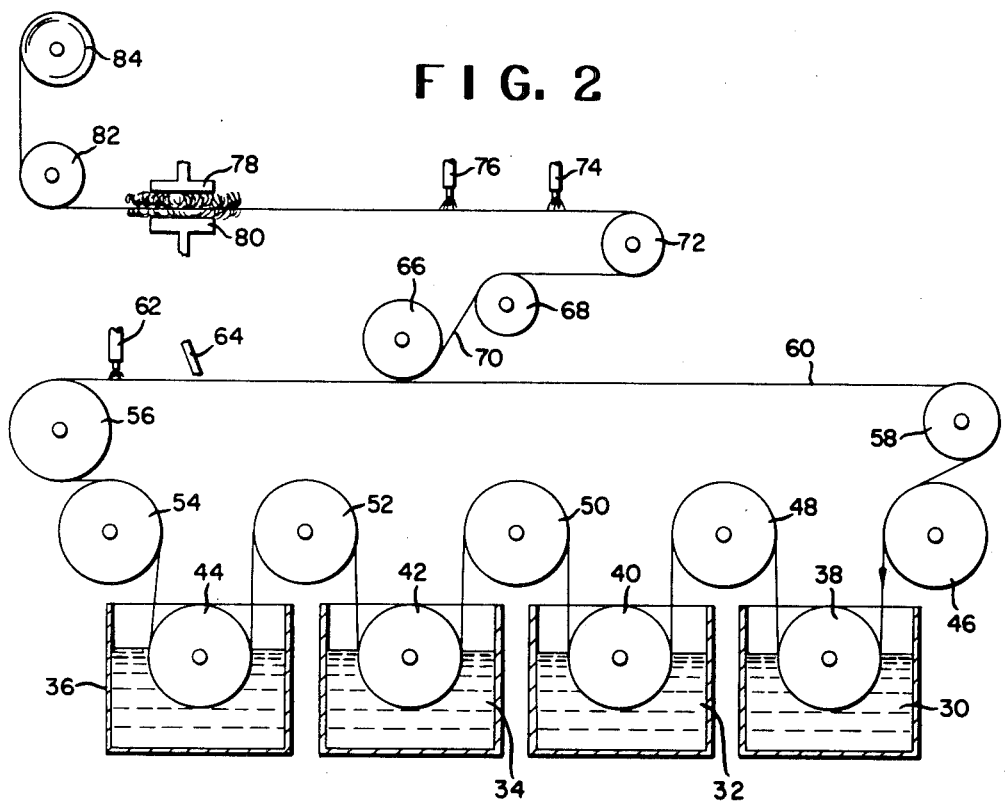
FIGURE 2 is a diagrammatic side elevational view of an embodiment of apparatus suitable for the continuous production of electroformed chromium transfer film.

It is known that bright continuous metal foils, affixed by adhesives to polymer films, can be prepared by electroforming a thin layer of metal, such as nickel or copper, upon a temporary metal base, applying an adhesive layer and a relatively thin strong polymer film layer, curing the adhesive, and pulling the composite metal film-adhesive-polymer film away from the temporary base. However, it is necessary that the temporary metal base have very special properties to provide high adherence to the electrodeposited film to hold it during formation, yet low enough adherence so that the electrodeposited film may be stripped off when desired. Polished stainless steel or other chromium alloy and chromium plated metal surfaces have these special characteristics, when the composition and pH of the plating bath to be used with them are suitably adjusted.

Attempts to prepare similar bright continuous metal films by this technique have been totally unsuccessful. Bright chromium, plated by whatever means and whatever electrolytic conditions, adheres so tenaciously to stainless steel or previously deposited chromium plate that it cannot be detached without destruction.

Attempts have also been made to first deposit a metal film, for example nickel, which it is known can be detached, on the temporary base; then plate bright chromium thereon by the conventional commercial hexavalent chromium plating process; then apply an adhesive layer and self-sustaining polymer film layer; then cure the adhesive; then detach the composite. Such attempts have also been met with entire failure. When conditions of pH and composition of the nickel plating bath are chosen suitably for detachment of nickel alone, then during the chromium plating step the nickel and the chromium both simultaneously detach themselves, for reasons unknown, breaking up into tiny curl flakes. When conditions are progressively altered so the nickel layer is held more firmly to the temporary stainless steel or chromium base layer is no point where adherence during the chromium plating step becomes adequate until the bond of the nickel to the temporary base becomes so strong that nothing can be detached. I have, however, discovered, in accordance with this invention, that very excellent composite films composed of a thin, self-sustaining strong polymer, a chromium layer and a layer of either nickel, copper or iron can be obtained if, instead of using a commercial hexavalent chromium bath, one uses a trivalent or divalent chromium plating bath, for example, a chromium plating bath as described and claimed in Deyrup U.S.P. 3,006,823, issued October 31, 1961; Deyrup U.S.P. 3,009,333, issued December 18, 1962, and Berzins U.S.P. 3,021,267, issued February 13, 1962. With any of these baths, a satisfactory tolerance of conditions can be determined for the prior electrodeposition step, whether it be nickel, copper or iron is immaterial, where the composite metal layer will adhere during the chromium deposition step, yet come off by stripping with an adhered self-sustaining film when desired. The divalent baths of Deyrup U.S.P. 3,009,333 are especially to be preferred because the chromium films are the brightest.

Exceedingly thin electroformed chromium film may be produced in accordance with this invention by electroplating a thin layer of nickel, copper or iron (between 3 and 60 microinches in thickness) on a smooth surface of chromium containing metal, e.g., chromium, stainless steel or other chromium alloy, electroplating chromium, from a bath in which the chromium is divalent or trivalent, to a thickness of ½ to 100 microinches over said nickel, copper or iron electroplate, adhering a self-supporting flexible film to the surface of said chromium electroplate, and with the self-supporting film, pulling the combined underlying metal and chromium electroplates from the chromium-containing metal support surface. The nickel, copper or iron electrodeposit may then be readily removed by dissolving the same in a liquid that will attack such metal but is inert to chromium.

While the nickel, copper or iron layer appears bright initially, I find it necessary or desirable to remove it so that pure bright chromium remains, because these metals tarnish or even corrode badly, in contrast to chromium, resulting in undesirable appearance and poor heat-reflective quality. It is also undesirable to leave on the underlying electrodeposited metal even when the chromium layer is on top, and the metal is sandwiched between the chromium and the adhesive layer. In this case, the underlying metal, being of relatively poor corrosion resistance, can be attacked by weather exposure, resulting in loss of bond and detachment of the chromium layer.

The resulting, exceedingly thin, non-selfsupporting pure bright chromium film substantially free from other metals and backed with a self-supporting film of organic matter, is a unique product that has many ornamental and utilitarian uses. It has been found that such thin pure bright chromium film, which is highly resistant to corrosion, may be tightly and permanently adhered to substantially any kind of surface for surface protection and ornamentation. It can be permanently bonded to metals, for example, copper, aluminum, iron or carbon steel to protect the surface thereof against corrosion and greatly enhance its appearance. It can be permanently bonded to paper, fabrics, ceramic objects, transite sheeting or concrete.

The chromium films of this invention may be produced batchwise or continuously, as illustrated in the drawings. Referring to the embodiment shown in FIGURE 1, reference numeral 10 designates a supporting base plate having a metallic chromium-containing surface layer 12. The base plate may be composed of any metal or even any other rigid electrically conductive material; however, the surface layer on which the electroplate is to be formed must be composed of a chromium-containing metal, for example, chromium, stainless steel, or other chromium alloy the chromium content of which is about 8% or more, since it serves as a parting layer, i.e., a layer from which the electroplated nickel and chromium film can be stripped. The base plate 10 may conveniently be formed of polished brass on which the chromium layer 12 is formed by chromium electroplating. In the description of the drawings, specific reference shall be made to the use of nickel as the underlying base electrodeposit. Although nickel is preferred because more work has been done therewith, it is to be understood that copper or iron electrodeposit can be substituted with like results for the nickel.

The nickel layer 14 is electroplated over the chromium-containing metal layer 12 and pure chromium layer 16 is electroplated over the nickel layer 14. It has been found that nickel, copper or iron can be plated on a chromium-containing metal surface with just the desirable amount of adhesion whereby the nickel film will remain adhered to the chromium-containing metal surface until it is desired to strip it therefrom and yet it can be cleanly stripped by an adhered adhesive organic film from this surface when desired, providing that the final layer of chromium be plated from a bath in which the valence of chromium is two or three, not six.

A chromium-containing metal surface, i.e., a chromium, stainless steel or other chromium alloy base surface can be replated with nickel and chromium layers and stripped many times without the necessity of buffing or polishing.

The strippable chromium and nickel electroplates 14 and 16 are so very thin that they cannot support themselves sufficiently to be removed from the chromium base layer 12. It is necessary that an adhesive film 22 be adhered to the surface of the top chromium layer 16 and the adhesive film combined with the chromium and nickel layers 14 and 16 stripped from the chromium, stainless steel, or other chromium alloy base layer 12.

The adhesive film 22 may be applied in a liquid form and evened with a doctor knife 20 to form the adhesive layer. After the adhesive layer 22 is dry, the composite chromium-nickel-adhesive film can be stripped from the chromium, stainless steel, or other chromium alloy base. In the event that the adhesive is of such a nature as not to form a self-sustaining film, a paper, cellophane or other film can be positioned on the adhesive to become a part of the composite stripped film. Alternatively, the organic stripping film may consist of paper or cellophane containing a layer of pressure-sensitive adhesive.

The stripped composite film will have the nickel, copper, or iron film on the outside and chromium film between the adhesive film and the other metal film. The nickel, copper, or iron film can be easily removed to expose the chromium surface by dissolving the underlying metal in a chemical that will be inert to the chromium, for example, a 10% solution of $FeCl_3 \cdot 6H_2O$.

A continuous film of pure bright electro-formed chromium on an adhesive supporting film can be produced on a continuous chromium surfaced, stainless steel or other chromium alloy metal belt as shown in FIGURE 2. In accordance with the embodiment of apparatus shown in FIGURE 2, continuous metal band or belt 60, having a chromium-containing metal surface, is passed from guide rolls 58 and 46 over plating roller 38 which rotates in a nickel plating electrolyte in tank 30 where the exposed outer surface of the belt is electroplated with nickel in a conventional manner. The nickel electroplated belt is then passed over guide roller 48 and washing roller 40 in tank 32 where any remaining electrolyte is washed from the belt. The belt is then led over guide roller 50 and chromium plating roller 42 which rotates in a chromium plating electrolyte, containing chromium in a divalent or trivalent form, in tank 34 where the belt is electroplated with chromium over the nickel electroplate. The belt is then subjected to a second washing step by passing the same over guide roller 52 and washing roller 44 in tank 36. The washing solutions in wash tanks 32 and 36 are preferably clean water but may contain small quantities of alkaline detergent to neutralize any acid electrolyte that may be carried over from the plating baths.

The belt is then passed over guide rollers 54 and 56 to an adhesive applying area. An adhesive that will form a relatively strong self-sustaining supporting film by solidification from a liquid is applied in any desired manner, for example, by spraying a film-forming solution of polyvinyl alcohol from a nozzle 62 and smoothed out with a doctor blade 64, preferably raised about 0.08 to 0.5 mm. from the surface of the chromium plate. After thorough solidification and adherence of the supporting film to the chromium plated surface of the belt, it is passed over stripping rollers 66 and 68. The thin composite film 70, composed of supporting layer, chromium layer and nickel layer, is stripped from the chromium plated, stainless steel, or other chromium-containing metal surface of the belt 60.

The film 70 is passed from stripping roll 68 over guide roll 72 to guide roll 82. Between rolls 72 and 82 the film 70, with nickel plated surface at the top is treated to remove the nickel plate. This may be accomplished by spraying the film with a solvent as from nozzle 74, then washed with water as from nozzle 76 and dried, for example, by blowing warm drying air against both sides of the film which now consists of only the organic film and pure bright chromium film. As illustrated, the drying air is passed against the film from blowers 78 and 80. From guide roll 82 the chromium-organic film is wound on a mandrel to form roll 84.

As above mentioned, the nickel plate can be made to have just the right degree of adherence to the chromium plated, stainless steel, or other chromium alloy base surface. The nickel plate may be varied to between 3 and 60 microinches. The lower limit is chosen so the chromium-nickel composite layer will not be too difficult to remove. The upper limit is chosen to avoid an unnecessarily heavy nickel layer to be later dissolved away. In general, adherence decreases moderately with increasing nickel thickness. Small amount of copper in the plating bath will also lessen nickel adherence.

A variation in the process of nickel plating by the well known nickel sulfate-nickel chloride plating process (Watts bath) that will decidedly influence the degree of adhesion of the nickel plate to the chromium, stainless steel, or other chromium alloy base surface is a variation of the pH value of the bath. Nickel plating from a Watts bath is usually carried out at an acidity between pH 2.0 and pH 5.2. The adherence of the nickel plate to the chromium or alloy at this acidity is relatively low to very low. On the other hand, when plating from such a bath at a high acidity, i.e. at a pH value of less than about 1.6, the adherence becomes relatively high. Generally, it is preferred to plate from a Watts bath or a modified Watts bath at a pH between 1.6 and 2.

Increasing the current density at which the plating takes place will also generally increase the adherence of the plate. It was, furthermore, found that preconnection of the chromium or alloy base plating surface to the power supply before introduction into the nickel plating bath has a profound effect in decreasing adherence of the plate.

After completion of plating some increase of adherence may be obtained by heat treatment, for example, by heating in air or with boiling water. It is evident that the factors governing adherence of a nickel plate on a chromium or chromium alloy surface are many and they are inter-related. An optimum adherence for one plate may vary considerably from the desired optimum in another plate. Also a variation in adhesive organic film may require a different adherence. An adjustment of the plating process in accordance with the above-described details will permit adjustment to the desired adhesion by an operator of the process. By far the most important variable to govern adhesion is the control of the pH of the nickel plating bath. If the other conditions are maintained substantially constant the adhesion can be completely controlled by the adjustment of the pH of the bath within the above-described limits of 1.6 to 2.

While nickel is most suitable for the purpose of providing the thin detachable metallic support for the chromium layer, it is also practical to use either copper or iron for this purpose. For example, the chromium or chromium alloy base may be coated by electrolysis with copper from a solution containing 1 mole per liter of copper sulfate, the pH being adjusted within the range 0.2 to 4 by addition of sulfuric acid. Or the said base may be coated by electrolysis with iron from a solution containing 1.6 mole per liter of ferrous chloride, and 3.1 moles per liter of calcium chloride, together with sufficient hydrochloric acid to adjust the pH in the range of 0.2 to 4. In either case, the same thicknesses are most useful as in the case of nickel, namely 3 to 60 microinches. Also, in either case the pH should be adjusted, depending somewhat on the other conditions of electrolysis such as temperature and current density, so that the adherence of the copper or nickel will be sufficient to retain the same attached to the base while the chromium is being deposited, and yet low enough so that the composite metallic films can readily be detached as necessary in the later step of the process.

Figure 1:
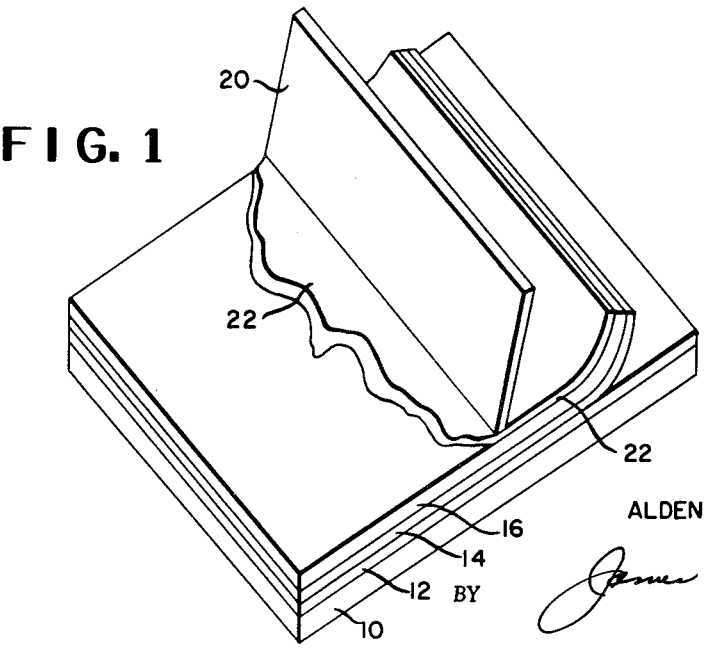
FIGURE 1 is a diagrammatic perspective view showing electroformed chromium and nickel layers on a chromium, stainless steel or chromium alloy surface and a method for removing said combined chromium and nickel layers with an adhesive film.

In the event that a new chromium-containing metal base surface is to be prepared, the metallic base for the chromium-containing metal surface whether of the batch type of FIGURE 1 or the continuous type of FIGURE 2, care should be taken to clean the metallic base surface, for example brass surface, well to secure uniform coating of chromium-containing metal thereon. There are many known processes for the thorough cleaning of surfaces to be plated and such steps are no particular part of this invention. A brass-surfaced base plating structure may be cleaned, for example, by immersing for a few seconds in a 10% sodium phosphate solution (10%

$$Na_3PO_4 \cdot 12H_2O$$

in water) at room temperature and scrubbed over the entire surface with a paper towel wet with the same solution. After rinsing with tap water it is immersed in hydrochloric acid for 5–10 seconds. After a second rinsing these treatments are repeated. After a final rinsing the panel preferably drains without a water break. The degree of cleaning may be altered to suit the necessities of the processor.

The following examples are given to illustrate certain preferred procedures to produce the chromium-self-sustaining films of this invention, it being understood that the invention is not to be taken as limited to these details.

Any nickel, copper, or iron plating process may be used for the present invention. Suitable plating processes are exemplified as follows:

The nickel plating solution is prepared by dissolving 120.0 gm. $NiSO_4 \cdot 7H_2O$, 24.0 gm. $NiCl_2 \cdot 6H_2O$, 15.2 gm. $H_3BO_3$ in water and making up to 400 ml. by addition of water containing 0.05% by weight of "Duponol" ME (the sodium salt of lauryl alcohol sulfate). The pH value of the solution is then adjusted by adding hydrochloric acid to a pH of between 1.6 and 2.0 (preferably about 1.94±.02). If it is found that the adherence of the nickel plate is too great, raise the pH, or if too low, lower the pH slightly.

This solution is stable and may be used repeatedly.

The chromium plate over the nickel, copper, or iron plate may be applied from any one of many chromium plating baths in which the chromium is present in the divalent or trivalent state. In order that the combined metal-chromium film be plated at a relatively high speed and can be removed without apparent tearing, it is essential that this chromium plate have a thickness of not more than about 100 microinches. There is no lower limit in this respect on the thinness of chromium plate which may be used. However, at thicknesses below ½ microinch the reflectances of light and heat by the chromium film and also the pleasing brilliant appearance decrease very rapidly. Several of these chromium plating processes will be hereinafter described, it being understood that they are independent inventions described and claimed in other patent applications and are no part of this invention.

In plating from the divalent chromium plating bath, described below, the nickel, copper, or iron plated base surface is placed in a chromium plating solution made by mixing 15 gm. $Na_2CrF_4$ and 0.30 ml. of n-octyl alcohol in 290 ml. of a stock solution composed of 40 ml. 70% glycolic acid, 40 ml. sodium glycolate solution (made by mixing 35.0 gm. 70% glycolic acid, 24.0 gm. $NaHCO_3$ and 50 ml. water); 12 gm. sodium formate and 200 ml. of 1 mole per 1000 gm. $4NaF \cdot 5B_2O_3$ solution are added to complete the stock solution.

The compound $4NaF \cdot 5B_2O_3$ and its preparation is described in U.S. Patent to Clare and Deyrup No. 2,823,095. The compound $Na_2CrF_4$ may be prepared in accordance with the process described in U.S. Patent to Deyrup No. 2,996,353, issued August 15, 1961.

The plating is carried out with the bath at a temperature of about 25° C. with graphite anodes, and with a current density of about 70 amperes per square foot. Plating for a period of 2 seconds to 10 minutes will produce plates of 0.5 to 150 microinches.

The plating may, alternatively, be carried out with a trivalent chromium plating bath. Such a bath may be prepared by mixing 350 ml. of 98% formic acid in 2000 ml. water and then at a temperature of about 100° C. reacting this dilute formic acid solution with 180 gm. $CrO_3$ dissolved in 500 ml. water. The formic acid solution is placed in a 6-liter flask fitted with a reflux condenser and a magnetic stirrer. The chromic acid solution is placed in a dropping funnel. A few drops of $CrO_3$ solution are added to the formic acid solution and the latter is then stirred and heated to boiling. When the reduction of $CrO_3$ by HCOOH starts (change of color from red to blue-green), the $CrO_3$ solution is added slowly from the dropping funnel. Since the reduction of $CrO_3$ by HCOOH is accompanied by evolution of heat and $CO_2$ in large quantities this reaction can be violent when too concentrated reactants are used or if the $CrO_3$ solution is added too fast. After the addition of $CrO_3$, the chromic formate solution is kept at boiling temperature until the reduction of $CrO_3$ is completed.

Three hundred ml. of 4 molar glycolic acid and 380 ml. of 4 molar sodium glycolate solution are added to the hot chromic formate solution. Glycolic acid will quickly reduce traces of $CrO_3$ left in the formate solution.

Two hundred seventy gm. of sodium formate is then added to the hot solution.

Eighty-three gm. NaF and 310 gm. $H_3BO_3$ are mixed and dissolved in 1000 ml. of boiling water. Small amounts of insoluble material (sometimes present in NaF) are filtered off, and this solution added to the bath. The bath is then diluted to 6 liters by adding water and is chilled to room temperature. The pH of the bath is preferably maintained between 3.9 and 4.1.

Plating with this bath may be carried out with the bath at about room temperature, using graphite anodes and a current density of about 70 amperes per square foot. This process plates with high efficiency, a plate of 0.5 to 100 microinches being produced in from 2 seconds to 10 minutes plating time.

Another suitable chromium electroplating bath, the chromium being in the trivalent state, was prepared in the following manner: A solution of 348 gm. of 70 weight percent glycolic acid in 500 ml. of water was heated to 90° C. To this was slowly and cautiously added a solution of 200 gm. chromic anhydride ($CrO_3$) in 400 ml. of water, while maintaining temperature at 90–100° C. After this addition was completed, the mixture was boiled for one-half hour. Then 22 gm. of 70% glycolic acid was added and the solution was boiled down to 800 ml. to ensure complete reduction of hexavalent chromium to trivalent. To this solution was added 435 gm. potassium sulfamate; 38 gm. sulfamic acid; 120 gm. boric acid; 1 gm. of n-octyl alcohol; and water to a final volume of 2000 ml. The pH was adjusted to 2.3 by small additions of potassium hydroxide and/or sulfamic acid. This bath was used at room temperature, with current densities of about 85 amperes per square foot, depositing pure bright chromium at a current efficiency of about 8%.

As another example of a suitable bath, in which the chromium is in the divalent state, and which provides an exceptionally strong bright pure chromium film, the following solution and specific conditions of use are given. A mixture was made of 0.57 gm. mole of chromium (II) chloride; 1.17 gm.-moles of sodium formate; 1.33 gm. moles of boric acid; 2.90 gm.-moles of sodium chloride; and water to a total weight of 100 gm. This solution was made with materials substantially free from sulfur and selenium (less than 10 p.p.m.). To the solution was added 0.15% by weight of "Petrowet" R, a saturated hydrocarbon sodium sulfonate, and 0.1% by weight of n-octyl alcohol, to improve uniformity of distribution of electrodeposits. This solution was found to deposit exceptionally strong chromium film when used at 55° C. and current densities of 100–450 amperes per square foot, the current efficiency increasing with current density.

While all of the above represent practical conditions which will lead to bright chromium films having a purity in excess of 95% Cr in the metallic state, the baths containing divalent chromium are preferred because they consistently produce the brightest chromium.

As above stated, after the nickel and chromium plating, a self-sustaining adhesive strip, having sufficient strength to pull the plate from the base surface, will be adhered to the outer chromium surface and the composite nickel-chromium-adhesive film will be pulled or stripped from the chromium, stainless steel, or other chromium alloy base surface. Adhesives of substantially all classes may be used to adhere the chromium plate to an adhesive strip. The adhesive may constitute the stripping film itself or the adhesive may be of such nature that a separate fibrous or nonfibrous organic film is necessary to be adhered to the plated film.

The flexible, self-sustaining films used to strip the metals from the chromium-containing metal base surface must, of course, be sufficiently strong to withstand the necessary pull without breaking. In order to produce particularly desirable composite films, the properties of the adhesive film may be important. It is preferred that the adhesive film have sufficient hardness and toughness that the stretch of the film be as low as possible to avoid objectionable splitting, cracking or tearing of the plate by the stripping operation. It is also preferred to use a film having a thickness between about .05 and 5 mils. A number of particularly desirable adhesive films will be hereinafter discussed, it being understood that the scope of the invention includes adhesive flexible film or strips in general regardless of the material of the film or strip or the adhesive used therewith.

Polyvinyl alcohol films have been used to good effect as stripping films. The polyvinyl alcohol can be applied from a 9% solution in water. Since most polyvinyl alcohol films are water soluble, the subsequent treatment to remove the nickel plate will have to be done with a solvent other than with an aqueous solvent. Polyvinyl alcohol film may, however, be treated with an agent to render the same water insoluble in a known manner, for example, by treating the same with a cross-linking agent such as glutaraldehyde.

Epoxide resin films such as glycidyl polyethers of dihydric phenols may be obtained by reacting a poly-functional phenol such as resorcinol or bisphenol (2,2-bis(4- hydroxyphenyl)propane) with an excess of epichlorohydrin or glycidyl polyethers of polyhydric alcohols may be obtained by reacting a polyhydric alcohol, such as glycerol, with an epoxy ether, such as bis(2,3-epoxypropyl)ether. Such films may be very rapidly solidified by contacting the same with a diamine such as ethylene diamine. The ethylene diamine may be liquid or gaseous thus making the use of such epoxy resins particularly useful in a continuous plating process as illustrated in FIGURE 2 of the drawings herein.

Another particularly useful film is the acrylic resin film produced from a combination of an acrylic interpolymer and a phenol, urea of unreamelamine formaldehyde resin. Such resin composition may be compounded as follows:

| | Percent, by weight |
|---|---|
| Aqueous dispersion of interpolymer A (35.6% solids) | 81.4 |
| Aqueous dispersion of water dilutable, heat reactive phenol/formaldehyde resin (33% solids) | 4.6 |
| Aqueous ammonium hydroxide (28% $NH_3$) (to pH value of about 9.4) | 1.8 |
| Water | 12.2 |
| Total nonvolatile, percent | 30.5 |

The interpolymer A was prepared by emulsion polymerization from the following polymerization charge:

| | Parts by weight |
|---|---|
| Water | 200.0 |
| Sodium bisulfite | 0.1 |
| Sodium Lauryl alcohol sulfate | 0.5 |
| Polymerizable monomers: | |
|    Acrylonitrile | 63.0 |
|    Butyl acrylate | 32.0 |
|    Methacrylic acid | 5.0 |
| Potassium persulfate | 0.3 |

The polymerization reaction was carried out under an atmosphere of an inert gas, such as, e.g., nitrogen, in a suitable polymerization vessel equipped with stirrer, reflux column, thermometer and inert gas inlet. The water was deoxygenated by refluxing for about 15 minutes under the atmosphere of nitrogen and cooled to about 150° F. before adding the polymerizable monomers. The dispersing agent was added to the deoxygenated water along with the sodium bisulfite, after which the mixture of polymerizable monomers was added followed by addition of potassium persulfate as an aqueous solution. The aqueous polymerization charge was maintained at about 140° F. for about 2 hours or until the polymerization reaction was complete. Although the preferred polymerization temperature is about 140° F., the polymerization may be carried out at room temperature or as high as the refluxing temperature of the polymerization charge. After the polymerization reaction had run to completion the heated aqueous interpolymer dispersions were freed of residual monomers by blowing with air, which also removed some of the water thereby concentrating the dispersion.

The water-dilutable phenol/formaldehyde resin above referred to is commercially available as "Bakelite" BR15100 at 66% solids in an aqueous medium. The ratio of phenol/formaldehyde resin to the interpolymer on a dry basis is 5:95.

There are a number of ways whereby the electroformed metal film can be transferred with an adhesive to the final substrate. The simplest to consider is direct transfer. Here the adhesive is applied to the metal film while it is still on the base support surface. Alternatively, the adhesive may be applied to the final substrate. Then the final substrate is pressed to the forming base. When these are separated, the metal film should be directly transferred to the final substrate. Usually, while the substrate and base support surface are pressed together, the assembly is heated and cooled, to soften or cure and then set the adhesive layer. This method can best be practiced with nickel-chromium-organic composite film produced batchwise as illustrated by FIGURE 1.

For example, nickel-chromium composite plating on a chromium base surface was sized with a layer of polyvinyl acetate emulsion—55% solids, using a "doctor-blade" to establish reasonably uniform thickness. This was dried, and then covered with a piece of canvas. These were placed in a Carver press, pressured to about 1200 p.s.i., then heated to 93° C., held 5 minutes, water cooled, then reheated to 40° C. The pressure was released, and the canvas was immediately separated from the chromium base. It carried with it the entire Cr-Ni composite. This was etched with aqueous 10%

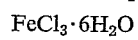

$FeCl_3 \cdot 6H_2O$ by flowing this on the metallized surface. This removed the nickel. The product showed a bright smooth chromium surface, with very little textile pattern texture. Reheating in an oven to 90° C. for 5 minutes relaxed the structure so that it remained bright, but the textile pattern reappeared.

Equally good results are obtained by sizing either the composite nickel-chromium plating or the substrate to which it is to be applied, in those cases where the substrate is relatively nonporous, such as steel or wood.

Another principal method for transfer is to pick the metal plating off the chromium or chromium alloy base support with a flexible strip bearing a pressure-sensitive adhesive, and then size the exposed metal with a different adhesive, and then press this to the final substrate, and then detach the flexible strip with the pressure-sensitive adhesive. This latter could presumably be reused, just as the chromium base support is reusable. It will be evident that this turns the metal layer upside down twice. Thus, if chromium is plated over nickel, and this transfer process is used, the final position on the substrate will be nickel side down next to the adhesive. Since this situation is not generally desired, it is expedient to etch the nickel off the chromium while both are on the flexible strip with the pressure-sensitive adhesive.

Cellophane tape containing a pressure-sensitive adhesive, "Scotch Tape," was applied to nickel-chromium plating and the composite film stripped from the support, thereby placing the Cr-Ni on the adhesive with the nickel side up. This was moistened with 10% aqueous $FeCl_3 \cdot 6H_2O$ and rinsed after the nickel was dissolved. The chromium surface was sized with polyvinyl acetate emulsion and placed on a piece of cotton cloth. The assemblage was clamped and allowed to dry. When the "Scotch Tape" was pulled off, it separated cleanly with the pressure-sensitive coating still tacky, leaving the bright chromium transferred to the cloth.

A nickel-chromium composite plate, similarly transferred to "Scotch Tape," was sized and air-dried. After drying, the emulsion side was placed on a piece of bond paper. The assembly was clamped between asbestos sheets and heated in an oven at 115–120° C. for 20 minutes. After cooling, the assemblage was pulled apart. The metal film was firmly attached to the paper.

It is believed that the best mode for transfer of the Ni-Cr composite film is to adhere the same to a self-supporting organic film and strip the same from the base support to form a self-supporting film having an extremely thin chromium surface. This composite film may then be attached to any desired base material.

Particularly desirable results may be obtained by mounting the chromium film of this invention on films composed of a high-melting, difficultly soluble, microcrystalline, cold-drawing, linear, highly polymerized ester of terephthalic acid and a glycol of the series

$HO(CH_2)_nCH$ where $n$ is an integer within the range of 2 to 10. Such polymerized ester films are sold under the trade name "Mylar," the esters being disclosed in greater detail in U.S. Patent No. 2,465,319.

Also, especially valuable results are foreseen in the lamination of the chromium films of this invention to a polyvinyl fluoride film of the type disclosed in U.S. Patent No. 2,419,010. Such laminated films may be adhered to metal to produce upon said operation a unique extremely durable metallic-appearing finish.

In most cases it is desirable to remove the nickel plate immediately after the composite film is stripped from the chromium supporting base. In some cases, if the nickel is allowed to remain on the chromium plate the metallic film becomes dull or frosty in appearance. Microscopic examination shows that the metal film has been broken in a myriad of fragments which have curled with the chromium on the concave side of the curl.

The removal of the nickel, or copper, or iron can be easily accomplished by wetting the nickel surface with a 10% aqueous solution of $FeCl_3 \cdot 6H_2O$. This immediately etches the nickel surface which will appear milky or hazy for a period of seconds and then suddenly becomes bright as the last nickel is dissolved. The $FeCl_3$ solution containing the dissolved nickel is then washed from the film and the film dried. Although $FeCl_3 \cdot 6H_2O$ has been found particularly useful for this purpose, any solvent or solvent solution that will dissolve nickel, copper, or iron without attacking the chromium, or the organic backing film may be used as well. For example, the following may be used for this purpose:

A 10% solution of cupric chloride ($CuCl_2$) in water, or a dilute solution of chlorine gas in water.

To remove nickel, copper, or iron from a composite film in which the adhesive backing consists of polyvinyl alcohol, a water-soluble material, a methanol solution containing 10% $FeCl_3 \cdot 6H_2O$ and 10% $CaCl_2$ may be used to good effect.

The nickel or other metal is so thin that it will be removed with a solvent within one or two minutes.

The chromium plating to be produced by one of the above-described methods may have a thickness of from ½ to 100 microinches and preferably between ½ and 20 microinches. At thicknesses in the upper end of this range and down to 2 microinches, reflectivity, as measured with a Hunter Reflectometer, averaged 84% of that of a highly polished 302 stainless steel (an austenitic alloy containing 17–19% Cr, 8–10% Ni, 0.08–0.20 C, 2. Mn max. balance Fe). It should be noted that the appearance of a metallic coating depends on two largely independent properties. One of these is the degree of microscopic smoothness, related to specular reflection of light as opposed to scattered reflection of light. The other is total reflectivity, related to total light reflected as opposed to light absorbed. The chromium coatings of this invention are excellent in both respects. By using an etched or frosted base plate for forming the chromium films of this invention, it will be evident that the high total light reflectivity will be maintained, yet a frosted or satin metallic finish can be produced if desired.

At thicknesses of below 2 microinches the chromium plate becomes increasingly transparent with a corresponding decrease in reflected metallic appearance. By carefully controlling the thickness, a transparent, and yet metallically reflective film may be produced, useful for light control. Microscopic examination at 1000× of films of different thicknesses produced in accordance with this invention show hairline cracks; however, such cracks are not visible to the naked eye regardless of the thinness of the film.

Figure 3:
FIGURE 3 is a drawing of the X-ray diffraction pattern of chromium produced by the conventional commercial hexavalent chromium plating process.
Figure 4:
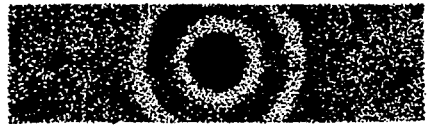
FIGURE 4 is a drawing of the X-ray diffraction pattern of chromium produced by a divalent or trivalent chromium plating process.

The composite chromium metal-polymer films prepared as described above were examined by various physical and chemical tests. When the metal layer was separated by dissolution of the polymer in organic solvents, it was found analytically to be pure chromium metal, i.e., having a purity greater than 95%. Continuous pieces of the chromium layer showed good electric conduction, characteristic of the metallic state. X-ray diffraction examination, however, showed that the chromium metal is in an unusual form, showing none of the well-defined sharp diffraction lines of previously known forms of chromium. This result is considered to indicate that the metallic chromium is essentially amorphous, or of extremely small crystallite size, or that the crystal lattice is highly distorted. This form of metal is unique in its combinations of this property together with high metallic reflectance, of over 75% of that of highly polished 302 stainless steel. Although chromium deposited on metals such as heavy nickel from the usual commercial hexavalent baths also has high reflectance, it cannot be subjected to detachment by the process herein described. X-ray diffraction patterns of chromium deposited from commercial hexavalent baths show the familiar sharp pattern of crystalline chromium shown in FIGURE 3 of the drawings. In contrast, the X-ray diffraction pattern of the chromium metal described above, deposited by the process of this invention, shows the diffuse or washed-out effect of FIGURE 4, thus indicating a lack of crystallinity or crystals of an exceedingly small size as compared with the size of crystals of chromium deposited from a hexavalent chromium plating bath.

The chromium plate films of this invention are highly resistant to corrosion as is evidenced by the following tests:

Exposure to saturated water vapor containing 0.5% sulfur dioxide produced no effect during six weeks exposure. In contrast, steel articles plated with chromium over nickel by commercial chromium plating processes are badly corroded and pitted in one to three days.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

I claim:

1. The process which comprises electroplating a metal taken from the group consisting of nickel, copper and iron to a thickness of about 3 to 60 micro-inches on a smooth chromium-containing metal base surface, electroplating chromium, from a chromium salt taken from the class consisting of divalent and trivalent chromium salts, to a thickness of ½ to 100 micro-inches on said metal plate, and removing said two electroplated films from said chromium-containing metal base with a self-sustaining flexible adhesive film adhered to said chromium plate.

2. The process which comprises electroplating a metal taken from the group consisting of nickel, copper and iron to a thickness of about 3 to 60 micro-inches on a smooth chromium-containing metal base surface, electroplating chromium, from a chromium salt taken from the class consisting of divalent and trivalent chromium salts, to a thickness of ½ to 100 micro-inches on said metal plate, and removing said two electroplated films from said chromium-containing metal base with a self-sustaining adhesive film adhered to said chromium plate, and dissolving from the surface of said metal-chromium-adhesive film the outer metal surface plate.

3. The process which comprises electroplating nickel to a thickness of about 3 to 60 micro-inches on a smooth chromium-containing metal base surface, electroplating chromium, from a chromium salt taken from the class consisting of divalent and trivalent chromium salts, to a thickness of ½ to 100 micro-inches on said nickel plate, and removing said two electroplated films from said chromium-containing metal base with a self-sustaining adhesive film adhered to said chromium plate, and dissolving from the surface of said nickel-chromium-adhesive film the nickel surface plate.

4. The process which comprises electroplating nickel to a thickness of about 3 to 60 micro-inches on a smooth chromium-containing metal base surface, electroplating chromium, from a chromium salt taken from the class consisting of divalent and trivalent chromium salts, to a thickness of ½ to 100 micro-inches on said nickel plate, adhering a thin self-sustaining flexible film to said chromium film, and pulling the composite nickel-chromium-self-sustaining film from said chromium-containing metal surface.

5. The process which comprises electroplating nickel to a thickness of about 3 to 60 micro-inches on a smooth chromium-containing metal base surface, electroplating chromium, from a chromium salt taken from the class consisting of divalent and trivalent chromium salts, to a thickness of ½ to 100 micro-inches on said nickel plate, applying a liquid adhesive capable of solidifying to a self-sustaining film on the surface of said chromium electroplate, solidifying said adhesive and pulling the composite nickel-chromium-adhesive film from said chromium-containing metal surface.

References Cited by the Examiner
UNITED STATES PATENTS

| | | | |
|---|---|---|---|
| 198,209 | 12/77 | Outerbridge | 204—13 |
| 1,731,415 | 10/29 | Grupe | 204—13 |
| 2,105,440 | 1/38 | Miller | 204—13 |
| 2,133,685 | 10/38 | Coughlin et al. | 204—13 |
| 3,069,333 | 12/62 | Deyrup | 204—51 |

JOHN H. MACK, *Primary Examiner.*